US012576453B2

(12) United States Patent　　　(10) Patent No.:　US 12,576,453 B2
McKinley et al.　　　　　　　　(45) Date of Patent:　Mar. 17, 2026

(54) MACHINING SYSTEM AND CUTTING INSERT AND METHODS

(71) Applicant: Allied Machine & Engineering Corp., Dover, OH (US)

(72) Inventors: Robert E. McKinley, Akron, OH (US); Logan Lamonica, Dover, OH (US)

(73) Assignee: ALLIED MACHINE & ENGINEERING CORP., Dover, OH (US)

( * ) Notice: Subject to any disclaimer, the term of this patent is extended or adjusted under 35 U.S.C. 154(b) by 0 days.

(21) Appl. No.: 17/524,882

(22) Filed: Nov. 12, 2021

(65) Prior Publication Data

US 2022/0072634 A1　　Mar. 10, 2022

Related U.S. Application Data

(63) Continuation of application No. 16/528,026, filed on Jul. 31, 2019, now Pat. No. 11,185,935.

(60) Provisional application No. 62/714,466, filed on Aug. 3, 2018.

(51) Int. Cl.
　　*B23B 27/22*　　　(2006.01)
　　*B23C 5/20*　　　(2006.01)
(52) U.S. Cl.
　　CPC ............ *B23C 5/20* (2013.01); *B23B 2200/08* (2013.01); *B23B 2200/32* (2013.01); *B23C 2200/32* (2013.01)
(58) Field of Classification Search
　　CPC .......... B23B 2251/48; B23B 2200/081; B23B 2200/321; B23B 2200/32; B23B 51/00035; B23B 2251/043; B23B 2251/085; B23B 2251/18; B23B 2251/14; B23C 2200/081; B23C 2200/32; B23C 5/205

See application file for complete search history.

(56) References Cited

U.S. PATENT DOCUMENTS

| | | | |
|---|---|---|---|
| 3,076,357 A | | 2/1963 | Benjamin et al. |
| 4,487,534 A | * | 12/1984 | Reiter .................. B23B 27/143 407/114 |
| 5,839,857 A | | 11/1998 | Paya |
| 6,270,297 B1 | | 8/2001 | Fang et al. |

(Continued)

FOREIGN PATENT DOCUMENTS

| | | |
|---|---|---|
| JP | 5859505 | 4/1983 |
| SU | 1155369 | 5/1985 |

(Continued)

OTHER PUBLICATIONS

European Patent Office, International Search Report/Written Opinion, Oct. 17, 2019, 15 pages, European Patent Office.

*Primary Examiner* — Alan Snyder

(74) *Attorney, Agent, or Firm* — Hahn Loeser & Parks LLP

(57)　　　ABSTRACT

There is provided a machining assembly and cutting insert for machining metal or like workpieces, wherein the cutting insert body has a cutting end. The cutting end comprises at least one cutting edge and at least one cutting lip formed adjacent the at least one cutting edge. The at least one cutting lip includes at least one cutting protrusion and associated chip cutting edge to split the chip formed by the at least one cutting edge, for producing chips during machining which are of a width that is sufficiently reduced to allow proper evacuation or removal.

20 Claims, 11 Drawing Sheets

(56)            References Cited

U.S. PATENT DOCUMENTS

| | | | | |
|---|---|---|---|---|
| 7,018,145 B2 * | 3/2006 | Mast | ................. | B23B 51/00035 |
| | | | | 408/233 |
| 9,879,483 B2 * | 1/2018 | Zuern | .................... | B28D 1/146 |

FOREIGN PATENT DOCUMENTS

| | | |
|---|---|---|
| WO | 2011001438 | 1/2011 |
| WO | 2012159947 | 11/2012 |

* cited by examiner

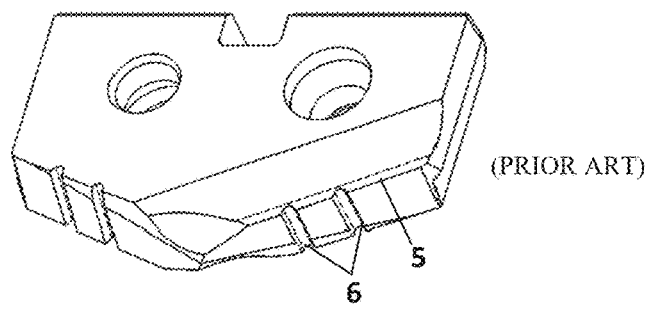
(PRIOR ART)
FIG. 1
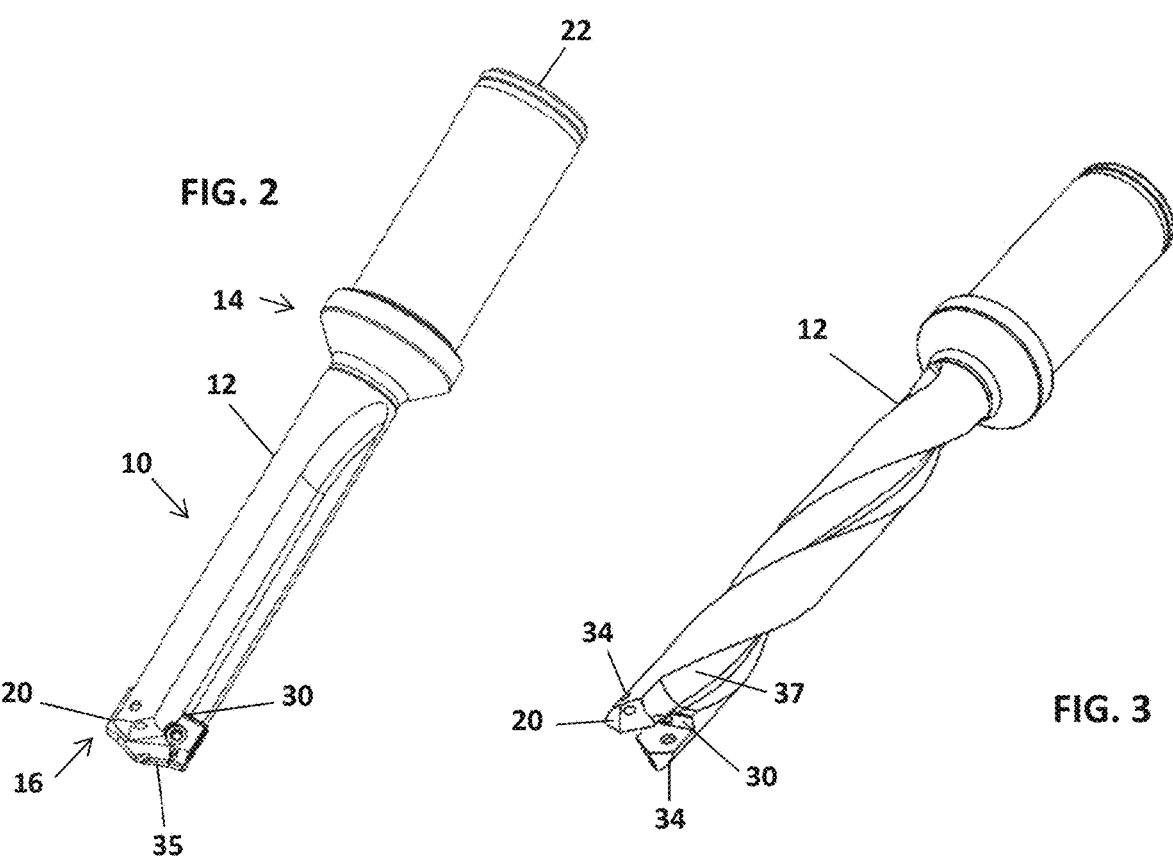
FIG. 2
FIG. 3

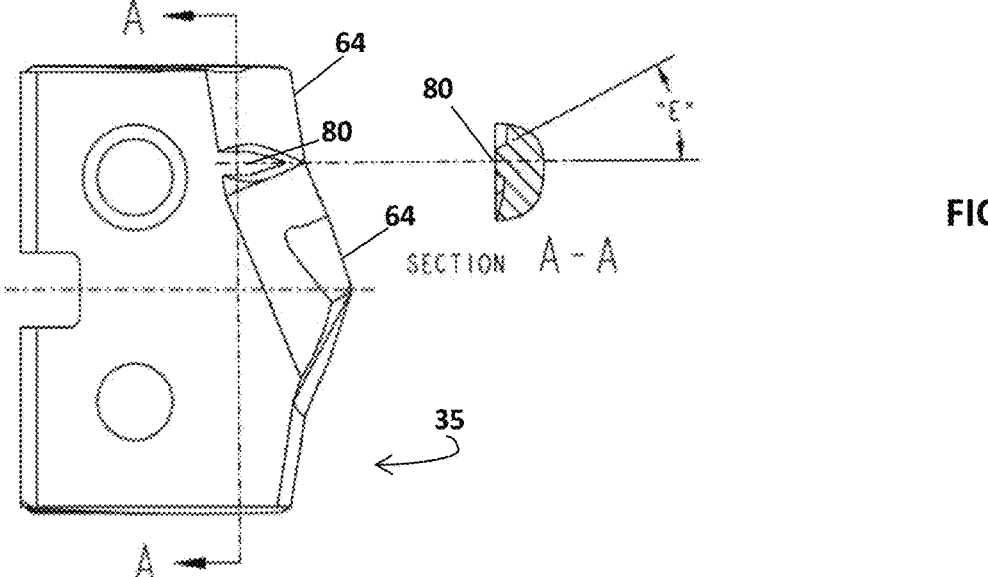
FIG. 11
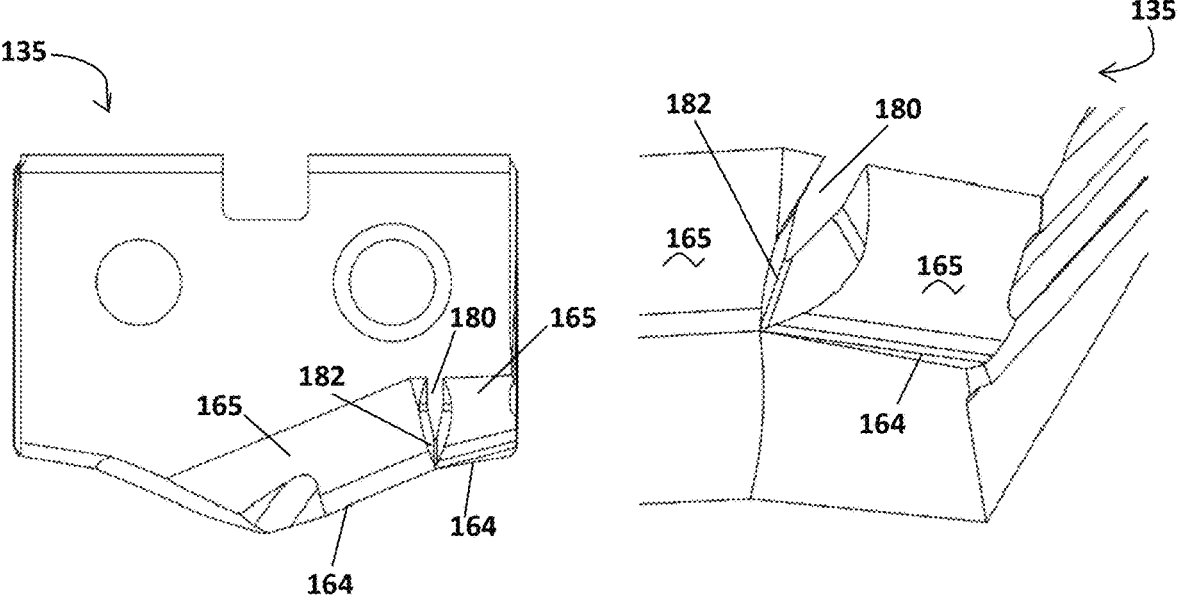
FIG. 12
FIG. 13

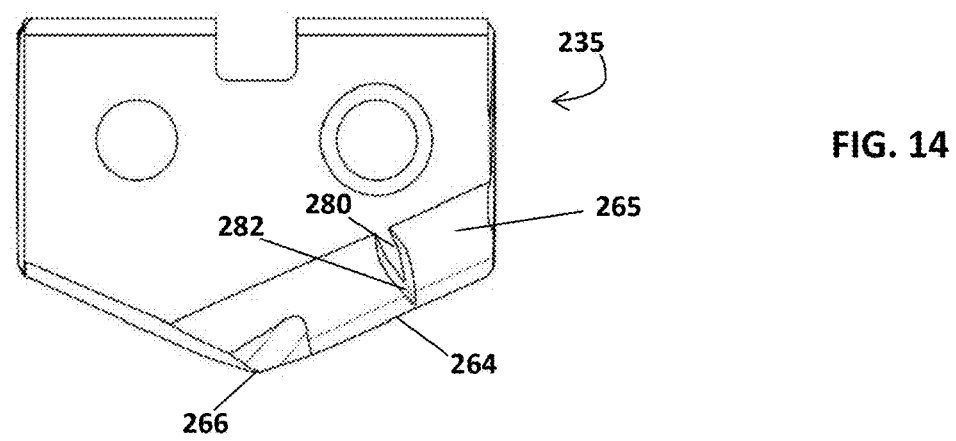
FIG. 14
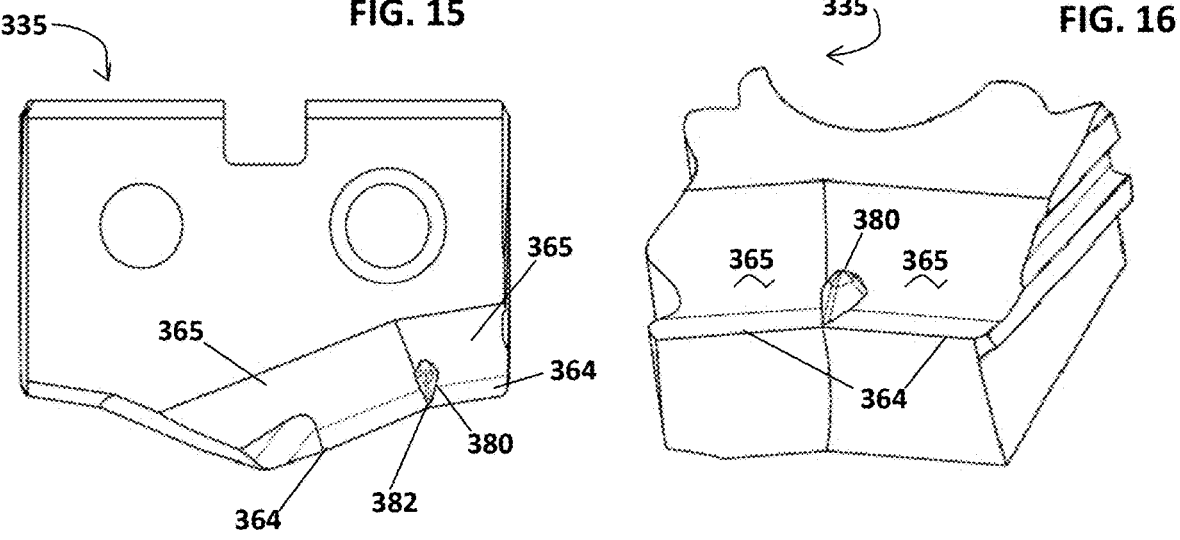
FIG. 15
FIG. 16
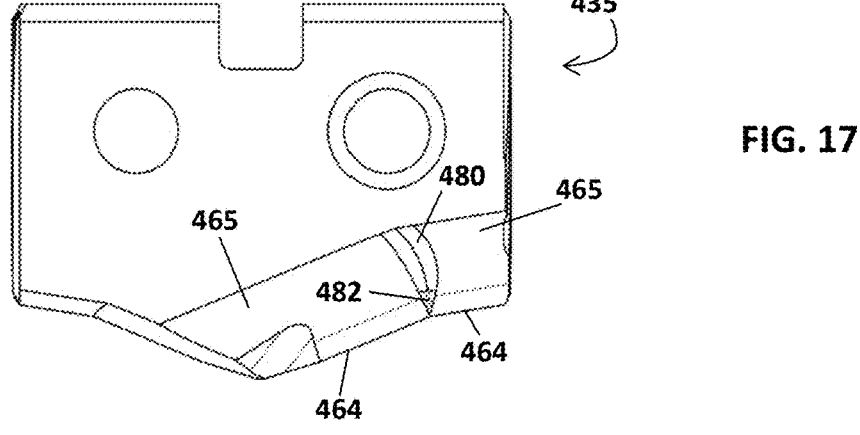
FIG. 17

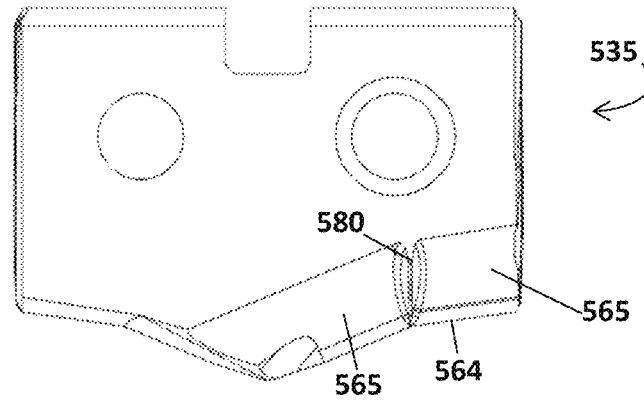
FIG. 18
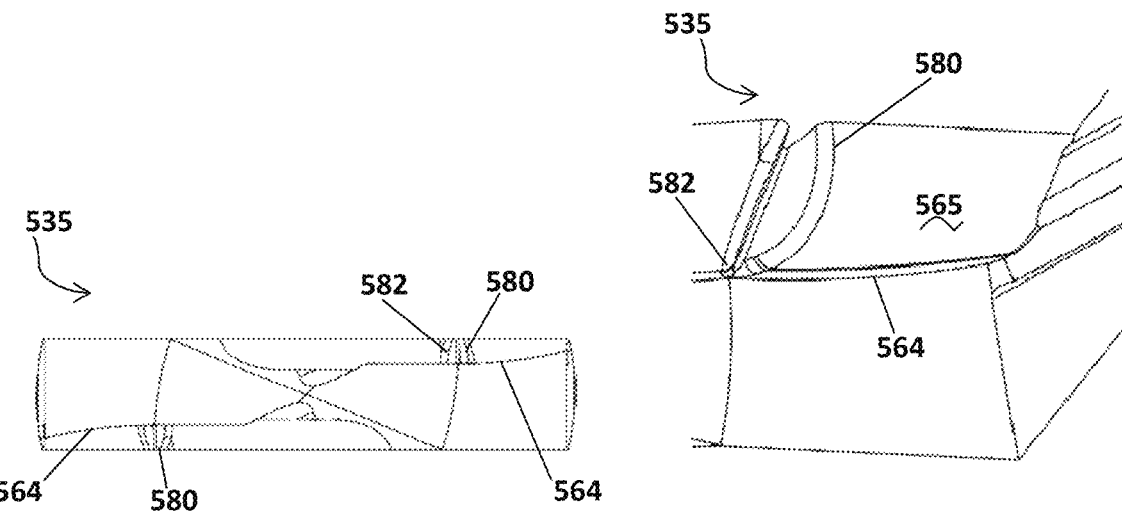
FIG. 19
FIG. 20

MACHINING SYSTEM AND CUTTING INSERT AND METHODS

CROSS REFERENCE TO RELATED APPLICATION

This application is a continuation of co-pending U.S. application Ser. No. 16/528,026 filed on Jul. 31, 2019, issuing Nov. 30, 2021 as U.S. Pat. No. 11,185,935, which claims priority to and the benefit of U.S. Provisional Patent Application Ser. No. 62/714,466 filed on Aug. 3, 2018, all of which are hereby incorporated by reference.

FIELD OF THE INVENTION

The present invention relates to the field of material cutting tools, and in particular to machining insert systems which machine workpieces in an accurate and effective manner while preserving the life of the insert used in the tool.

BACKGROUND INFORMATION

In machining systems or other material cutting operations in metal or like workpieces, there is a need to form machined part in effective and efficient manner. For example, for the purpose of machining holes into metal materials, it has been customary to employ spade drills or spade cutting inserts. With reference to FIG. 1, a spade cutting insert consists of a flat, generally rectangular plate of hard material such as tungsten carbide that is imparted with a point and cutting edges 5 on its forward side. The cutting edges 5 include chip breakers 6, which may be of various geometries. The spade insert is assembled into a holder with a front end for receiving the spade insert. The use of an insert allows for replacement of the insert after wear. Spade cutting inserts are known for their characteristic of providing economical means for producing holes in metal. As the tool becomes worn from use, the insert can be quickly and economically replaced with another insert. In many applications, this is preferable to conventional twist drills which are either expensive to replace or must be re-sharpened through a time-consuming process. Other cutting inserts are also used in machining of workpieces, such as in turning, boring, planing, shaping, machining, and reaming processes for example. Such inserts may include indexable IC inserts for example.

In the machining process, the formation of chips requires removal of the chips as they are produced. The physical properties of the material, as well as cutting functions such as feed rate, cutting speed, depth of cut, rake angle and the like, can affect chip formation. It is generally desirable to produce chips that are narrow and small, but this is difficult to achieve.

For metal machining operations to be successful, it is desired to form chips in a controlled manner as the cutting edge of the tool or insert penetrates the workpiece. In hole drilling, the chips must be of a size small enough to be easily evacuated from the hole during machining. The chip breakers 6 in the cutting edges of prior cutting inserts create discontinuities in the cutting edge 5 which cause a reduction in the width of metal chips produced. These notches have been formed in various shapes ranging from a half circle to a rounded V-shape.

The current design of chip breakers 6 have several short-comings. Firstly, each notch 6 in the cutting edge 5 produces two vertices at the cutting edge 5 each of which is both a stress riser and heat concentrator. These vertices are prone to chipping of the insert substrate, leading to failure of the tool. Additionally, chip breakers 6 are required to be situated so as to be asymmetrical. This results in further problems, such as 1) the asymmetry is undesirable because each of the two cutting edge segments is subjected to differing cutting forces which negatively affects cutting dynamics, and 2) the gaps in each cutting edge segment cause corresponding areas on the opposing cutting edge segment that are subjected to the full feed rate of the tool. These are areas where the feed is not equally shared by each of the two cutting edge segments and thus are subjected to greater forces resulting in greater local stresses. It should also be recognized that the notches 6 do not cause splitting of chips formed by the main cutting edge, but instead divide the main cutting edge to cause separate chip formation from the cutting edge between the notches.

Further, the internal flank surfaces of the notches 6 are predisposed to impact the sides of the ridges left in the workpiece by the gaps in the cutting edge segments. This necessitates higher cutting forces and also results in higher local stress. These increased local stresses occur adjacent to stresses at the corner vertices of the chip breakers and increases stresses caused by full-feed exposure.

There thus is a need for a machining tool that produces chips that are of a desired configuration and size small enough to be easily evacuated or removed during machining. There is also the need for a machining tool wherein the formation of chips during the machining process avoids the problems of producing vertices at the cutting edge segment and associated creation of stress risers and/or heat concentrators. It would also be desirable to provide a machining tool wherein problems, such as creating differing cutting forces on the cutting edge segments and/or exposing portions of the cutting edge segments to the full feed rate of the tool can be avoided. Further yet, it would be desirable to avoid the creation of ridges in the machining process that necessitates higher cutting forces and results in higher local stresses imposed on portions of the cutting edge segments.

The same concerns relate to other machining operations such as turning, boring, planing, shaping, machining, and reaming. For many applications, there is a need for tooling that can effectively produce chips in a desired manner dependent on the application and type of material being machined. Types of metal materials produce different chips based on the ductility, hardness and other characteristics of the material. Stainless steel, for example, generally produces continuous, long, curled chips that may cause chip jamming and increased power consumption and heat generation. It would be desirable to provide a machining tool that allows chip formation to be tailored to the type of material and application. It would also be desirable to provide a machining tool that allows for the flow of formed chips to be controlled for proper evacuation during machining.

SUMMARY OF THE INVENTION

The invention is directed to material cutting tools and structure to control the production of chips by the material cutting tools. More particularly, the present invention is directed to a cutting insert having configuration for improved chip formation while removing material from metal or other workpieces. The configuration of the machining tool controls chip formation as material is removed from a workpiece by cutting of the chips produced by the main cutting edges of the tool.

The configuration of the present invention is useful in any application wherein it is desirable to control the formation of the chips of material removed from a workpiece during cutting or machining operations such as, for example, drilling, turning, boring, planing, shaping, machining, and reaming. As an example, the configuration of the present invention is useful when incorporated into a hole drilling insert to allow proper evacuation of the formed chips from a hole in a workpiece during drilling.

In an example, there is provided a cutting insert for machining workpieces comprising: a body having a cutting end with at least one cutting edge and associated cutting lip. The cutting lip including at least one cutting protrusion with at least one chip cutting edge extending from position adjacent the at least one cutting edge of the insert for cutting chips formed by the at least one cutting edge during machining.

In another aspect of the invention, there is provided a machining tool assembly comprising a holder having first and second ends and a rotational axis. The second end is adapted to be fixedly attached in a machining machine, and the first end has at least one cutting insert mounted thereon. The cutting insert has a cutting end having at least one cutting edge and associated cutting lip. The cutting lip includes at least one cutting protrusion with at least one chip cutting edge extending from a position adjacent the at least one cutting edge of the insert s for cutting chips formed by the at least one cutting edge during machining.

The at least one chip cutting edge produces small, manageable chips with fewer concentrations of stress and heat, thus allowing the tool to perform at higher penetration rates and exhibit longer tool life. In an example, the cutting protrusion is formed as an elongate body extending into the cutting lip adjacent a cutting edge in the tool. The elongate body transitions to a point at its base adjacent the main cutting edge, and has flanks that transition to the cutting lip surface at an obtuse angle relative to the top surface of the cutting protrusion to form an increased width to the protrusion and to form the chip cutting edge.

The at least one cutting protrusion includes a body section having a height, with the chip cutting edge formed as a downward sloping rake face from the top surface of the cutting protrusion. The cutting protrusion may have a wedge shape with a width that transitions to a point adjacent a cutting edge of the tool or insert. The cutting protrusion may extend substantially the entire dimension of a cutting lip or over a portion thereof. The cutting protrusion may have a height which matches the thickness of the insert, or a lesser or greater height if desired. The cutting protrusion may be positioned in relation to a plurality of cutting edge segments, to enhance control of chip evacuation during machining operations, such as drilling. The arrangement provides for improved formation of smaller, thinner chips and better chip control in various applications, materials and machining conditions.

Other aspects of the invention will be apparent to those of skill in the art in view of the following written description and drawings relating to examples of the invention.

BRIEF DESCRIPTION OF THE DRAWINGS

FIG. 1 shows a perspective view of a prior art cutting edge segment with chip breakers formed therein.

FIG. 2 shows a perspective of a machining assembly including the cutting insert according to an example of the invention.

FIG. 3 shows a perspective view of the holder in the example of FIG. 2.

FIG. 11 shows a cross section of the chip cutting protrusion and chip cutting edge according to the example of FIG. 4.

FIG. 12 shows a side view of another example of a cutting insert according to the invention.

FIG. 13 shows an enlarged partial view of the cutting insert in the example of FIG. 12.

FIG. 14 shows a side view of another example of a cutting insert according to the invention.

FIG. 15 shows a side view of another example of a cutting insert according to the invention.

FIG. 16 shows an enlarged partial view of the cutting insert in the example of FIG. 15.

FIG. 17 shows a side view of another example of a cutting insert according to the invention.

FIG. 18 shows a side view of another example of a cutting insert according to the invention.

FIG. 19 shows a top view of the cutting insert of FIG. 18.

FIG. 20 shows an enlarged partial view of the cutting insert in the example of FIG. 18.

DETAILED DESCRIPTION

Figure 4:
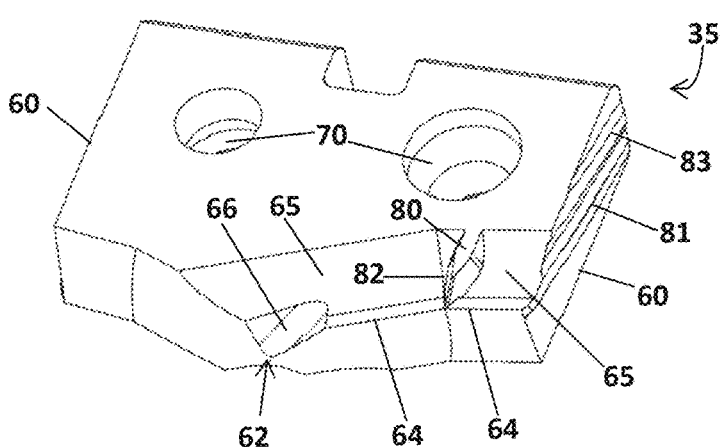
FIG. 4 shows a perspective view of a cutting insert according to a first example of the invention.

The invention provides significant improvement in the robustness and overall performance of machining products, by producing smaller, more manageable material chips with fewer concentrations of stress and heat on the cutting lips and cutting edge segments of the machining tool. This allows the tool to perform at higher penetration rates and provides longer tool life. The geometry of the machining tool is useful in any application wherein it is desirable to control the breakage of the chips of material removed from a workpiece during cutting operations such as, for example, drilling, turning, boring, planing, shaping, machining, and reaming.

The primary method by which chip splitting is achieved in the invention is the introduction of one or more chip cutting edges into the cutting lips of the machining tool at a point adjacent a cutting edge. The at least one chip cutting edge provides a cutting edge that a chip machined by a main cutting edge engages, for splitting of the formed chip and producing chips which are of a width that is sufficiently reduced to allow proper evacuation from the hole or the like.

In an example, one or more substantially perpendicular chip cutting edges extend substantially vertically from each of the cutting lips of the insert. The substantially perpendicular chip cutting edge constitutes the leading edge of a generally wedge-shaped protrusion. This chip cutting edge cuts and splits the chip as it is formed by the primary cutting edges. As the forming chip encounters and flows past the substantially perpendicular chip cutting edge, the wedge shape functions as a flow divider, causing the now-split chip to flow along two separate paths, each flanking the cutting protrusion, thus producing two narrower chips completely separated by the protrusion. This process produces chips that are of a width that is sufficiently reduced to allow proper evacuation from the hole or the like. This method also eliminates the highly heated and stressed, structurally fragile vertices exposed to the forming chips during the machining process, which are characteristic of conventional chip breaker design.

In an example, the chip cutting edges provide several advantages. Firstly, they reduce the width of chips, which is an important factor in reducing the chance of chips jamming the tool during the cutting operation. However, unlike conventional notches formed in the cutting edge, the chip cutting edge also imparts severe strain to the chips as they are split and flow against the flank surfaces of the wedge shape associated with the cutting protrusion and chip cutting edge. The increase in strain induces a propensity for the chip to more readily segment lengthwise into shorter pieces which are more easily evacuated from the hole or the like. Thus, the chips produced are both narrower and shorter.

Also, in an example, segments of the main cutting edge may be separated, with each segment having its own chip-forming zone, and each with its own geometry or cross-section. Thus, the geometry of each individual cutting edge segment can be optimized according to its diametric position on the machining tool or insert. Cutting lip segments situated radially more outwardly may have increased or reduced axial rake angles or differing curvature or radius size and position versus the inwardly positioned lip segments. This can contribute to improved performance of the tool. The use of cutting lip segments may also provide improved flexibility for optimizing its shape to be suitable for a variety of applications including various workpiece materials and machining parameters. Further, cutting edge segments can be symmetrically positioned in association with the main cutting edges so as not to have gaps which leave behind uncut material to be removed by the opposing cutting edge. Symmetrical lip geometry spreads chip load evenly across all edges, as each cutting edge segment is exposed to forces equal and opposite those of the matching cutting edge segment on the other side of the tool or insert. Because the main cutting edges do not have gaps which leave behind uncut material to be removed by the opposing cutting edge, they can be optionally designed in a symmetrical fashion. When the chip cutting edges are designed symmetrically, the main cutting edge is exposed to angular forces equal and opposite those of the matching cutting edge on the other side of the insert. In addition, the absence of gaps in the main cutting edges ensures that there are no areas which are subjected to the full feed of the cutting process. The cutting load is both evenly distributed and balanced across the matching cutting edges. This allows the tool to be operated at greater penetration rates without undue wear, chipping, or premature failure of the main cutting edge.

In an example, the at least one protrusion is designed to feature at its most forward end a pronounced and relatively sharp cutting edge that extends substantially perpendicularly to a cutting edge and vertically partitioning the rake face of the cutting lip. This chip cutting edge is designed to extend far enough away from the main cutting edge and rake face that the forming chip is not disposed to flow over it without splitting into two separate chips. The height of the cutting protrusion may extend to the main plate-thickness of the insert or it may extend further, to a height exceeding the main plate-thickness of the insert. The protrusion may also extend to a lesser height, depending upon the application and material for example. For example, cutting of more elastic materials may require more pronounced cutting protrusions than those that are less elastic. The cutting protrusion may also be positioned so that the base of its substantially perpendicular cutting edge is adjacent or nearly adjacent to the insert's main cutting edge in order to split the forming chip before it may curl naturally away from the cutting lip and thus away from the cutting protrusion.

In another example, there may be provided secondary drill point angles converging where the chip cutting edge bases are at their closest point to the main cutting edges. As chips are formed, they tend to flow along the rake face roughly perpendicularly to the cutting edges. These angles enhance the splitting characteristics of the cutting protrusions in two ways. First, lateral strain is induced in the chip as it flows along the rake face and departs the cutting edges on the two angles. This prestresses the chip before it reaches the substantially vertical chip cutting edge to be finally severed. Second, the angles orient the main cutting edges and cutting lips in a manner that directs the flow of material in an oblique direction with respect to the adjacent or nearly adjacent, chip cutting edge. This provides less restricted flow for each of the two chips generated by the cutting chip splitter geometry. The secondary angles aid in directing the flow around the cutting chip splitter, ensuring a complete splitting of the forming chip. Secondary angles can vary in degree and may be selected for suitability in any particular material-cutting application. Tools with an increased number of cutting chip splitters may incorporate additional adjacent point angles in accordance with the goal of improving chip separation and chip flow.

In another example, cutting lip geometry may be constructed with varied rake angles so that each axial element of the main cutting edge is itself optimized, thus providing optimum chip-forming geometry at every radial position within the segment. The lips may likewise be constructed with varying radii for each axial element. Also, the cutting edges may be curved in either a convex or concave manner. Indeed, the general shape of each lip may consist of non-primitive geometry thus optimized for cutting at each location on its edge and for any specific drilling application. The geometry of the cutting lip affects the way the chips formed by it tend to flow. The design allows varying the shape to predispose the chips to an inward curvature toward the center axis of the insert and to impart it with a sufficient strain that it will tend to straightforwardly segment into short pieces that are easily evacuated from the hole.

The design of the chip cutting edges are not affected by the means of incorporating the substantially perpendicular cutting edge into the main cutting lip. The chip-splitting effect can alternatively be achieved by protrusions of varied wedge shape including axial curvature, convex or concave flank surfaces, flat or curved top surfaces, etc.

This design may be produced by any of a variety of manufacturing methods including machining, pressing, injection molding, protrusion assembly by fastener, braising, adhesive, or in any other suitable manner.

Turning to the FIGS., examples of a machining system according to the invention are set forth. A first example of the machining insert is shown in FIGS. 2-5, which is directed to a machining system 10 which comprises a holder 12, which has a body 14 and head portion 16 associated therewith. In the preferred embodiment, holder 12 has, in general, a cylindrical shape with a first end 20 and second end 22. As shown in FIG. 2, the first end 20 of holder 12 has a clamping or holder slot 30, which may extend across the entire diameter of the head portion or, at least over a center portion thereof, at the general location of the rotational axis of holder 12. The holder slot 30 has a bottom wall positioned in substantially perpendicular orientation relative to the rotational axis of the holder 12. The holder 12 may further include a locating boss or dowel pin, which is positioned precisely with respect to the rotational axis and extends from the bottom wall of the holder slot 30. Alternatively, the locating boss, may be configured as an integral member extending from bottom wall and positioning a cutting insert 35 precisely with respect to the holder 12 to perform the desired machining function in conjunction therewith. The machining insert 35 has a point geometry comprising a plurality of cutting surfaces, which are precisely positioned with respect to the rotational axis of the holder 12 to minimize errors in a resulting machining operation using assembly 10.

More particularly, in this example, holder 12 is shown in FIG. 3, and may be configured to include at its first end 20 a pair of clamping arms 34, which extend about holder slot 30. The clamping arms 34 include holes, which accommodate screws to secure the cutting insert 35 in its position within the holder slot 30. The holes are threaded to engage screws, and mate with screw holes formed in the cutting insert 35 in a predetermined manner to precisely locate the cutting insert 35 in a predetermined location within holder slot 30. Each of the clamp arms 34 may also include a lubrication vent, which allows the application and flow of lubrication adjacent the cutting surfaces of the cutting insert to facilitate the machining operation. The clamp arms 34 may also include angled or curved surfaces, which facilitate chip removal via chip evacuating grooves 37 on each side of the holder 12. The seating surface is shown to be designed as a planar surface, which corresponds to the planar bottom portion of the cutting insert 35, although another configuration of bottom surfaces may be employed and is contemplated herein.

Figure 5:
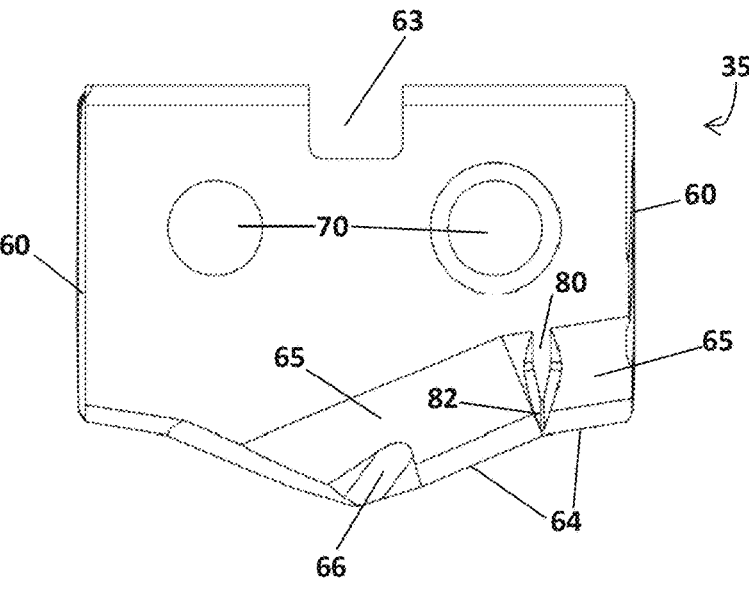
FIG. 5 shows side view of the cutting insert in the example of FIG. 4.
Figure 6:
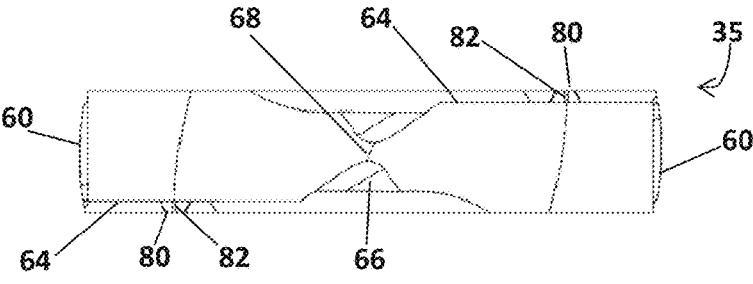
FIG. 6 shows a top view of the insert in the example of FIG. 4.

Turning to FIGS. 4-6, a first example of the cutting insert 35 is shown. The cutting insert 35 may be formed as a spade cutting blade, with side edges 60 of the blade being generally parallel with the rotational axis of the holder 12 once the insert 35 is positioned and secured with holder 12. When secured with holder 12, cutting insert 35 will also have a rotational axis, which is coaxial with axis of holder 12. The cutting insert 35 has a width, which, upon being rotated with holder 12, forms an outside diameter of the assembled tool. In this example, the cutting insert 35 further includes first and second cutting lip segments 65 with associated cutting edges 64 on its upper surface. The cutting edges 64 are on each side of the axial center 62, also known as the dead center, and a clearance surface is formed behind the cutting edges 64. The cutting edges 64 provide a plurality of cutting components, which cooperate together to provide the desired cutting surface for the material and/or machining application. In general, the insert 35 is designed to cut when rotationally driven in conjunction with holder 12 in a predetermined direction. The cutting insert 35 further includes apertures 70, which cooperate with the apertures in clamp arms 34 to secure insert 35 within holder slot 30 and seated against the seating surface. Additionally, each of the apertures 70 are preferably formed with countersunk portions formed as a bearing surface adapted to be engaged by a corresponding tapered or like surface on the screws or other fastening mechanisms. By offsetting the axes of the apertures 70 with corresponding apertures in the clamp arms, upon securing insert 35 within slot 30 by means of screws, the insert 35 will be forced downwardly against the seating surface. Insert 35 may include a locating slot 63, which allows positioning of a locating pin therein.

The cutting insert 35 further comprises sides or lands 60 across the width of the insert 35, each side 60 comprising helically extending margins 81 and 83 along with radially inward positioned clearance surfaces adjacent the margins 81 and 83. The margin surfaces 81 and 83 are cylindrically formed about the rotational axis of the insert 35 and contact the edges of the hole being cut. The trailing side of the margins 81 and 83 are helical wherein the margin width is helically increased from the cutting edge segment on one side to the opposite side of the spade cutting insert 35. The margin 81 extends from the upper cutting edge corner to the back corner of the insert width. The second margin 83 is provided to prevent chips from accumulating adjacent the margin 81, and also provides four point edge contact between the machining insert 35 and the formed hole, thereby providing stabilization and better accuracy and finish. The helical margins 81 and 83 results in contact of virtually the entire radial width of the side 60 at two locations. The helically extending margins 81 and 83 increase the stability of the assembled tool 10 in operation and help prevent excessive exit chatter for example.

Insert 35 also includes a V-notch feature 66 located on either side of the chisel 68, which is formed across the insert web and extends through axial center. The V-notch 66 forms a type of flute on either side of insert 35, which reduces the web and length of chisel 68. The V-notch 66 may be formed having a small radius at the bottom of the notch, which extends outward from the radius center along linear or curved legs forming the sides of the V-notch 66. In an example, the notch cutting edge is formed with a positive rake, which cuts the material by forming a chip and minimizes extrusion or deforming of the metal during cutting operations. The positive rake of the V-notch 66 allows the insert cutting surfaces to bite into the workpiece in a more aggressive fashion, which results in the ability to use higher feed rates while increasing stability and creating less heat at the tip of the insert 35. The V-notch 66 further helps improve the self-centering capability of the cutting insert 35. Alternatively, the notch 66 can also be used with an insert having a self-centering configuration, wherein a multi-faceted chisel point 68 is created by a clearance cut along a longitudinal center line of insert 35, which is parallel to the cutting edges 64, or created by a diagonal clearance cut extending through the center point of chisel 68 from each trailing edge corner. The insert 35 could also include a spur point, which may be formed by grinding clearances on either side of the chisel 68 to create the spur.

As seen in the example of FIGS. 4-6, the insert 35 includes at least one cutting protrusion 80 in the at least one cutting lip 65. The at least one cutting protrusion 80 is designed to feature at its most forward end a pronounced and relatively sharp chip cutting edge 82 that extends at a predetermined orientation relative to the cutting edge 64 and cutting lip 65. In this example, the at least one protrusion 80 is substantially perpendicular in the cutting lip 65 adjacent cutting edge 64 and vertically partitioning the rake face of the cutting lip 65. Alternatively, the angle of the cutting protrusion and associated chip cutting edge may be varied. In this example, the cutting lips 65 are formed with a positive radial rake angle, which for various applications, can provide a reduction of cutting forces and power requirements, facilitate desired chip formation and avoid the formation of a built-up edge. The position of the at least one cutting protrusion in the cutting lip 65 may be varied, but in general, it may be desired to split the formed chip from the cutting edges 64 into predetermined widths by means of the chip cutting edge. The predetermined widths may in general be similar to one another to form split chips of similar size. The position and orientation may also facilitate chip formation as the flanks of the cutting protrusion may engage and help form chips into a desired configuration. In general, the at least one cutting protrusion 80 and chip cutting edge 82 provide consistently smaller, easier to manage chips regardless of speed or feed rates, providing significant flexibility in use.

Figure 7:
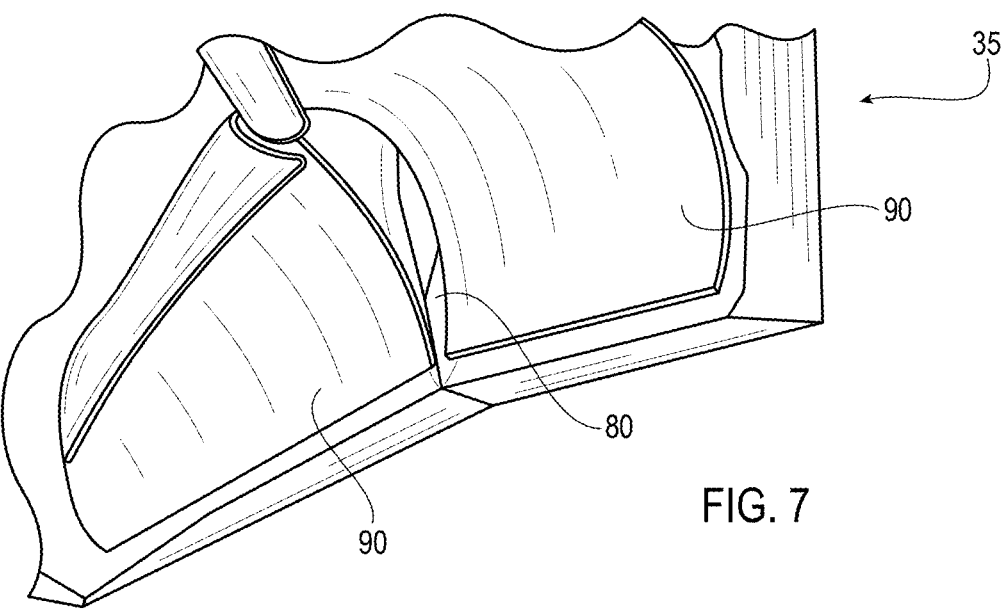
FIG. 7 shows a perspective view of the cutting insert in the example of FIG. 4 showing the formation of chips by the cutting insert.

As seen in FIG. 7, the chips 90 produced by chip cutting edges 82 associated with protrusions 80 provide several advantages. Firstly, like conventional chip splitters, they reduce the width of chips, which is an important factor in reducing the chance of chips jamming the tool during the cutting operation. However, unlike conventional chip splitters, they also impart severe strain to chips as they are split and flow against the flank surfaces of the wedge shaped protrusion 80 and associated chip cutting edge 82. The increase in strain induces a propensity for the chip to more readily segment lengthwise into shorter pieces which are more easily evacuated from the hole. Thus, the chips produced are both narrower and shorter as desired.

Also in this example, by providing cutting edge segments 64 and associated cutting lips 65, each segment may have its own chip-forming zone, and may also each have its own geometry or cross-section. Thus, the geometry of each individual cutting edge segment 64 can be optimized according to its diametric position on the insert 35. Cutting lip segments 65 situated radially more outwardly may have increased or reduced axial rake angles or differing radius size and position versus the inwardly positioned lip segments 65, which can be optimized for improved performance of the tool. The cutting edge segments 64 can also facilitate splitting of the chip by the chip cutting edge. In this example, the outboard cutting edge 64 is formed to spread the formed chip and make it easier for the chip cutting edge 82 to cause splitting of the formed chip. The shape of the cutting protrusion can also facilitate chip splitting. In this example, the cutting protrusion is formed as a wedge type shape that will stretch the chip as it is engaged by the chip cutting edge to help split the chip and the flank surfaces then act to facilitate flow of the chips away from one another after being split. It is contemplated though that the shape of the cutting protrusion 80 may be varied and can be optimized for the application, material or based on other factors. In this example, the width, height, and wedge angle may vary, or other characteristics of the wedge shape may be varied for example. Similarly, the angle of the flanks of the cutting protrusion may be varied. In general, it is desired to have the cutting protrusion pronounced enough to cut or split the chip immediately after it is formed by the main cutting edge. The front edge forming the chip cutting edge 82 may be made more pronounced for example, particularly for use with softer or more ductile materials for example. The draft angle of the cutting protrusion flanks or chip cutting edge may also be configured to make the chip cutting edge more or less pronounced as may be beneficial.

As seen in this example, the chip forming zone of the outboard cutting edge segment 64 is oriented differently from the chip forming zone of the inboard cutting edge segment 64. As an example, the rake angle of the inboard cutting lip segment may be between 1-15 degrees for example, while the rake angle of the outboard segment cutting lip segment may be 2-18 degrees, or the angles may be varied within each segment for example.

Figure 8:
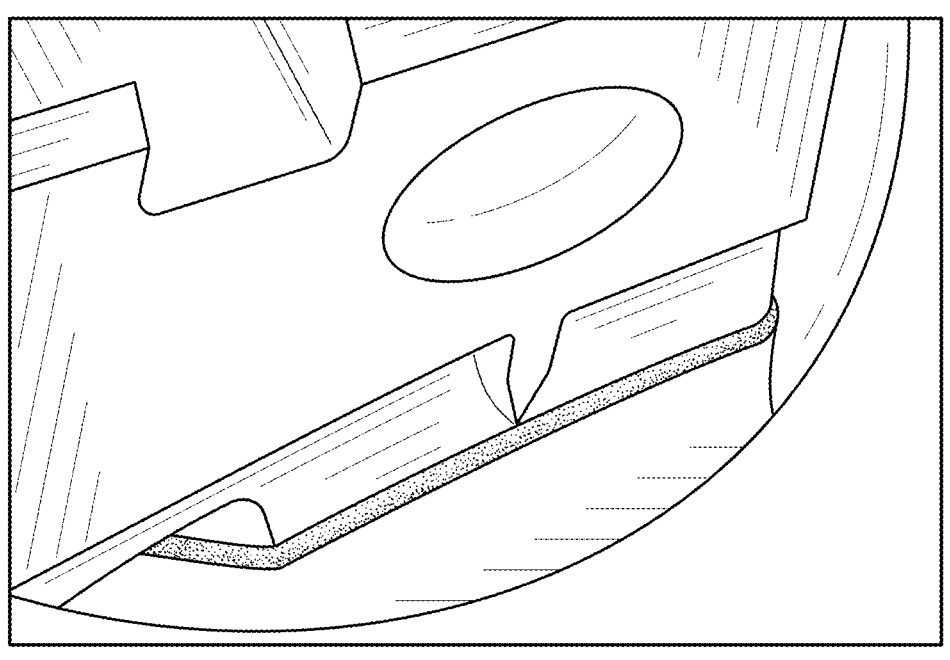
FIG. 8 shows a perspective view of the cutting insert in the example of FIG. 4 showing balanced and even cutting of a workpiece material by the cutting edges of the cutting insert.

Referring back to FIG. 1, the prior chip breaker configuration left gaps in the main cutting edge. In the invention as seen in FIG. 8, because the main cutting edges 64 do not have gaps which leave behind uncut material to be removed by the opposing cutting edge, they can be optionally designed in a symmetrical fashion. The main cutting edges 64 are exposed to angular forces equal and opposite those of the symmetrically matching cutting edges on the other side of the insert 35. In addition, the absence of gaps in the main cutting edges 64 ensures that there are no areas which are subjected to the full feed of the cutting process. The cutting load is both evenly distributed and balanced across the matching cutting edges as shown in FIG. 8. This allows the drill to be operated at greater penetration rates without undue wear, chipping, or premature failure of the main cutting edge.

Figure 9:
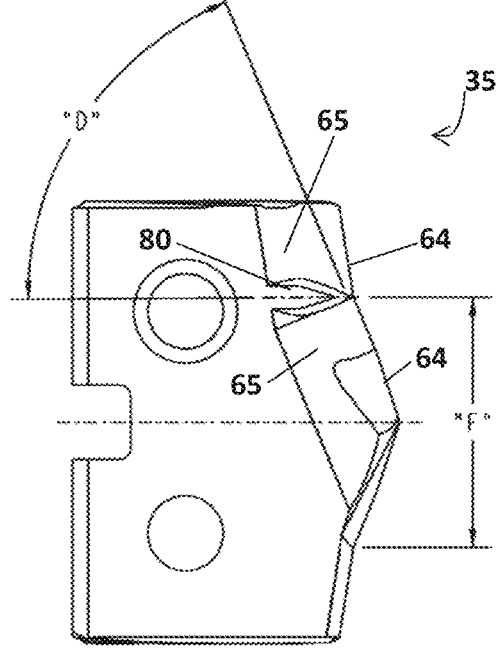
FIG. 9 shows a side view of the cutting insert in the example of FIG. 4.
Figure 10:
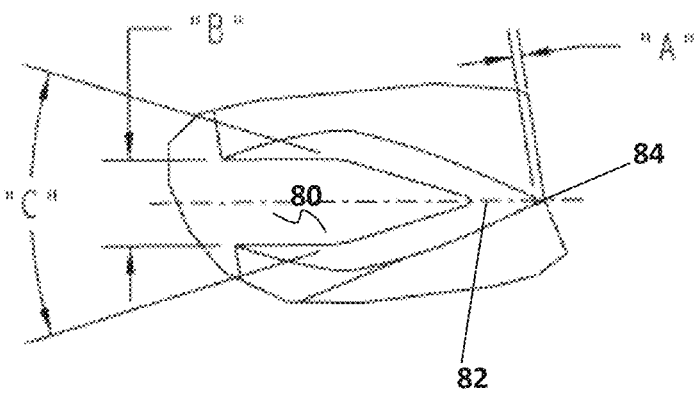
FIG. 10 shows an enlarged partial view of the chip cutting protrusion and chip cutting edge according to the example of FIG. 4.

In this example, the cutting lip protrusion 80 and chip cutting edge 82 are shown in more detail in FIGS. 9-11. The cutting lip protrusion 80 is generally formed at the location of the cutting edge segments 64 in the space of the cutting lips 65. The cutting protrusion 80 is designed with its most forward end 84 creating a pronounced and relatively sharp cutting edge 82 that extends substantially perpendicularly to the main cutting edge 64 and substantially vertically partitioning the rake face of the cutting lip 65. This substantially perpendicular chip cutting edge 82 is designed to extend far enough away from the main cutting edge 64 and rake face of cutting lip 65 that the forming chip may not be disposed to flow over it without splitting into two separate chips. The cutting protrusion 82 in this example is formed as an elongate body extending into the cutting lip 65 to a point adjacent a cutting edge 64 in the insert 35. The elongate body transitions to a point at its base adjacent the main cutting edge, and has flanks that transition to the cutting lip surface at an angle relative to the top surface of the cutting protrusion to form an increased width to the protrusion and to form the chip cutting edge. The flanks may be nearly perpendicular to the top wall or at an angle as shown. The angle may change based on the application, material or other factors. In this example, the angle of the cutting protrusion 80 and chip cutting edge 82 relative to the cutting edge 64 results in splitting of chips wherein the split chip ends up not interfering to any significant extent with the inside flank wall of the cutting protrusion 80, which reduces cutting forces, stresses and temperature. The height of the cutting protrusion 80 may extend to the main plate-thickness of the insert 35 as seen in FIG. 11, or it may extend further or to a lesser degree as may be warranted for a particular application. For example, cutting of more elastic materials may require more pronounced cutting protrusions 80 than for use with materials that are less elastic. The cutting protrusion 80 may also be positioned so that the base of its substantially perpendicular cutting edge 82 is adjacent or nearly adjacent to the insert's main cutting edge 64 in order to split the forming chip before it curls naturally away from the cutting lip and thus away from the cutting protrusion 80 and chip cutting edge 82. This position, shown as dimension "A" in FIG. 10, may be directly adjacent or some distance away from the main cutting edge 64 for suitability in a variety of applications and or cutting edge preparation geometries. In an example, the dimension A is between 0.005 and 0.030 inches, or more particularly between 0.010 and 0.020 inches. The cutting protrusion also has a width "B" as seen in FIG. 10, which is designed to provide sufficient structural integrity to cut the formed chip without failure. The dimension B generally depends on the size of the tool, and may also be tailored to the type of material being machined, to have sufficient extent to ensure cutting of the formed chip by the chip cutting edge 82. In an example, the dimension B may be between 0.030 and 0.20 inches, but again may vary according to the application. The forward end 84 of the cutting protrusion 80 is designed with sufficient acuteness as not to impede the flow of the chip along the rake face and through the cutting lip 65. However, it must not be so narrow that it becomes fragile and susceptible to failure during the cutting process. In an example, the wedge angle, shown as dimension "C" in FIG. 10, between 20 and 50 degrees, and more particularly between 30-40 degrees. The cutting protrusion 80 and chip cutting edge 82 are oriented at an angle "D" as seen in FIG. 9, relative to the adjacent cutting edge 64. In an example, this angle is between 30 to 110 degrees, but may vary depending on the application. This orientation may be form at least one substantially perpendicular chip cutting edge 82 extending vertically from at least one cutting lip 65 adjacent cutting edge 64. In this example, the cutting protrusion 80 and chip cutting edge 82 are aligned, but the cutting protrusion 80 may be segmented with portions oriented differently than the chip cutting edge 82, such as to allow control of chip flow during a machining operation. The chip cutting edge 82 may also be formed at an angle "E" as seen in FIG. 11, relative to the cutting lip 65. The angle E may be in the range of 5 to 60 degrees, or more particularly between 20 to 40 degrees, but also may be varied for a particular application or material for example.

In this example, at least two cutting edge segments 64 are provided in a symmetrical arrangement relative to point 62. The cutting edge segments 64 do not have gaps between them, which would leave behind uncut material to be removed by the opposing cutting edge. The cutting edges 64 can be designed in a symmetrical fashion, such that the symmetrical lip 65 geometry spreads chip load evenly across all edges, as each cutting edge segment 64 is exposed to forces equal and opposite those of the matching cutting edge segment 64 on the other side of the insert 35. In addition, the cutting load is balanced across the matching cutting edge segments 64, and there are no areas which are subjected to the full feed of the cutting process. This allows the cutting to be operated at greater penetration rates for example. For a particular application, it is also possible to arrange the cutting edges asymmetrically if desired.

Further, the cutting lip 65 geometry of the inboard and outboard cutting edge segments 64 may be constructed with varied rake angles so that each axial element of the cutting edge 64 and cutting lips 65 provide optimum chip-forming geometry at every radial position within the segment. The speed differential between the inboard and outboard cutting edge segments 64 can be taken advantage of in design of each segment. The lips 65 may likewise be constructed with varying radius for each axial cutting edge 64 element. Also, the cutting edge segments 64 may be curved in either a convex or concave manner. Further, the general shape of each cutting lip 65 may consist of non-primitive geometry thus optimized for cutting at each location on its edge and for any given specific application. The geometry of the cutting lips 65 may also be designed to affect the manner in which the chips formed by it tend to flow. In an example, for hole drilling applications, the shape is designed to predispose the chips to an inward curvature toward the center axis of the insert and to impart it with a sufficient strain that it will have a tendency to straightforwardly segment into short pieces that are easily evacuated from a hole being drilled for example. Alternatively, the geometry of the cutting edge segments and cutting lips may be provided to cause chips to flow away from each other and minimize interaction between the chips. It should also be understood that the characteristics of both the inboard and outboard cutting edge segments 64 can be controlled and include features described in association with one or the other of the cutting edge segments 64.

In this example, when the machining insert 35 is worn out or damaged, it is easily replaced in the holder body 12. The cutting lip protrusion and chip cutting edge configuration also allows the tool to perform at higher penetration rates and provide longer tool life. The presently disclosed machining system includes two effective continuous cutting edges from the center to the OD.

With reference to FIGS. 12-13, an alternative example of a machining insert is shown, wherein the machining insert 135 includes cutting edges 164 and associated cutting lips 165 with a cutting lip configuration having at least one protrusion 180 and chip cutting edge 182 as in the prior example. In this example, the cutting lips 165 are formed with negative radial rake angles. The negative rake angles provide a cutting face of the cutting tool that slopes away from the cutting edge 164 at the outer side, rather than a positive radial rake where the cutting face of the cutting tool slopes away from the cutting edge 164 at the inner side. In general, for some applications, it may be desirable to use a negative radial rake angle to increase the strength or life of the tool, or improve surface finish for example.

With reference to FIG. 14, an alternative example of a machining insert is shown, wherein the machining insert 235 includes a single cutting edge 264 and associated cutting lip 265, with a cutting lip configuration having at least one protrusion 280 and chip cutting edge 282. In this example, the chip cutting edge 282 is disposed substantially perpendicular to the cutting edge 264, and positioned a distance from the center axis 266 in the cutting lip 265. The distance from the central axis 266 may depend on the application, type of material being machined or other factors, and can be varied accordingly.

With reference to FIGS. 15-16, an alternative example of a machining insert is shown, wherein the machining insert 335 includes cutting edges 364 and associated cutting lips 365 similar to prior examples. The cutting lip configuration has at least one protrusion 380 and chip cutting edge 382 formed in the cutting lip 365. In this example, the chip cutting edge 382 extends over only a portion of the cutting lip 365, and is disposed substantially perpendicular to the cutting edge 364 and extending substantially vertically from each of the cutting lips 365 of the insert 335. The substantially perpendicular chip cutting edge 382 constitutes the leading edge of a generally wedge-shaped protrusion 380. This chip cutting edge 382 cuts and splits the chip as it forms, and causes flow of chips around the protrusion 380 at the location of chip formation. The dimension of the cutting protrusion 380 may vary depending on the application, material or other factors. The secondary drill point angles of cutting edges 364 are again designed in this example to converge where the substantially perpendicular chip cutting edge 382 base is at the closest point to the main cutting edges 364. Again, the secondary angles of cutting edges 364 can vary in degree and may be selected for suitability in any particular material-cutting application. Tools with an increased number of cutting chip splitters 382 may incorporate additional adjacent point angles in accordance with the goal of improving chip separation and chip flow if desired.

With reference to FIG. 17, another example of the invention is shown. In this example, the machining insert 435 includes cutting edges 464 and cutting lips 465 with at least one cutting lip protrusion 480 formed in the cutting lip 465. The protrusion 480 is curved toward the axis of the insert 435, such that it may reduce any interference with the outboard chip after being split by the chip cutting edge 482. In this example, it is noted that the cutting protrusion 380 has flanks formed at an angle to a point at the top of the cutting protrusion 380. The shape of the cutting protrusion can be varied to optimize function, or may include several shapes in its configuration. The curved protrusion 480 may facilitate formation of and directing chips in a desired manner. The curved cutting protrusion 480 may impart severe strain to chips as they are split to cause segmenting of the split chips into smaller pieces, by causing them to flow against the flank surfaces of the wedge shaped, curved protrusion 480, or to direct flow of the split chips. The increase in strain again induces a propensity for the chip to more readily segment lengthwise into shorter pieces which are more easily evacuated from the hole. In this example, it is noted that the With reference to FIGS. 18-20, another example of the invention is shown. In this example, the machining insert 535 includes cutting edges 564 and cutting lips 565 with at least one cutting lip protrusion 580 formed in the cutting lip 565. In this example, at least one of the cutting edges 564 and associated cutting lips 565 are curved. As seen in FIG. 19, the inboard cutting edge 564 has a first curvature and the outboard cutting edge 564 has a second curvature. The curvatures may be equal or different depending on the application, material or other factors. The at least one curved cutting edge 564 may provide improvement in chip formation during cutting operations. Each cutting edge 564 is curved in this example, and formed in a cutting edge plane such that the planes formed through the cutting edges 564 are transverse to each other and form the included angle. The cutting edges 564 are curved in the direction of rotation. The curved cutting edges 564 may include a plurality of segments, which cooperate together to provide the desired cutting surface for the material and/or drilling application. The cutting lips 565 formed adjacent the cutting edges 564 may be generally parallel to the associated cutting edge plane. The cutting lips 565 in combination with the curved cutting edges 564, may be configured to provide a positive axial and radial rake angle to aid in chip formation, or the rake angle may be neutral or negative if desired. The trough of the cutting lip 565 may be curved or linear. When the trough is linear, the cutting lip 565 will be parallel to the cutting plane, or the cutting lip may be slightly skewed such that the depth of the cutting lip decreases as it extends radially outward. When the trough of cutting lip 565 is curved, it may be generally parallel to the cutting edge 564. Whether the trough is curved, skewed, or linear, the trough of the cutting lip 565 may be considered to be substantially parallel to a plane formed through the adjacent cutting edge 564. The protrusion 580 may be formed in association with the curved cutting lip 565, to form a chip cutting edge 582. The protrusion 580 may again be substantially vertically oriented as in other examples, and positioned at the intersection of cutting edge segments 564.

Figure 21:
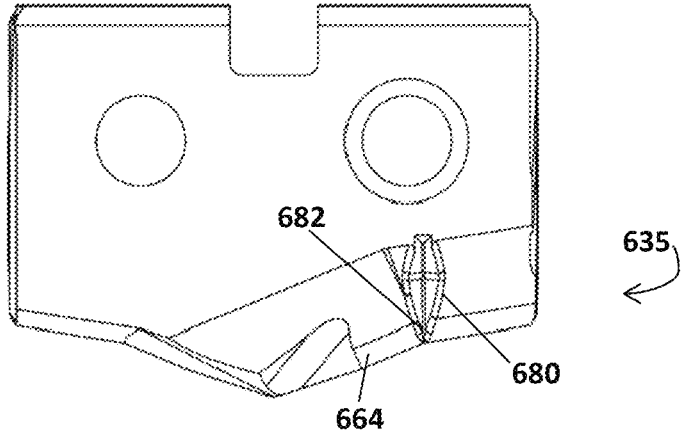
FIG. 21 shows a side view of another example of a cutting insert according to the invention.
Figure 22:
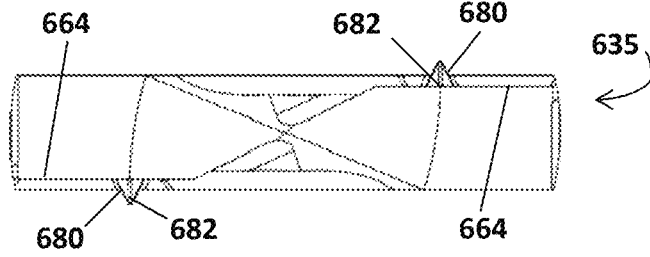
FIG. 22 shows a top view of the cutting insert of FIG. 21.

With reference to FIGS. 21-22, another example of the invention is shown. In this example, the machining insert 635 includes cutting edges 664 and cutting lips 665 with at least one cutting lip protrusion 680 formed in the cutting lip 665. In this example, the protrusion 680 forms a chip cutting edge 682 that extends above the thickness of the insert body. The height of the cutting protrusion 680 may extend to a height slightly exceeding the main plate-thickness of the insert 635, which may facilitate engagement with the formed chips to cause desired splitting thereof. Cutting of more elastic materials may require more pronounced cutting protrusions 680 than those that are less elastic for example. In this example, the characteristics of the holder (refer to FIG. 3) may need to be varied to accommodate the cutting protrusion 680. The protrusion may also extend to a lesser height, depending upon the application.

Figure 23:
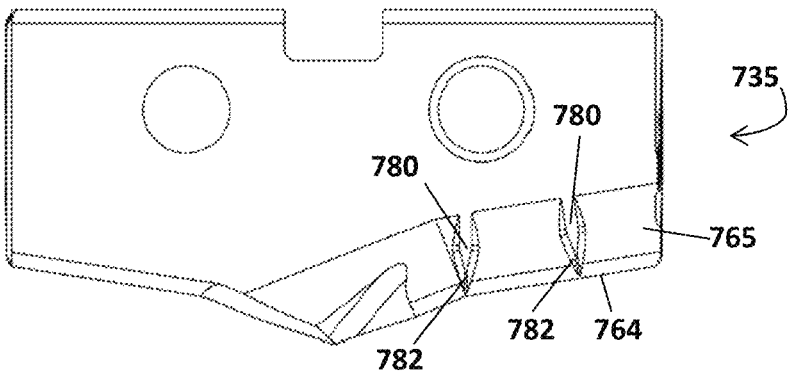
FIG. 23 shows a side view of another example of a cutting insert according to the invention.

With reference to FIG. 23, another example of the invention is shown. In this example, the machining insert 735 includes cutting edges 764 and cutting lips 765 with a plurality of cutting lip protrusions 780 formed in the cutting lips 765. In this example, a first inboard protrusion 780 forms a chip cutting edge 782 that extends substantially vertically in association with the protrusion 780 formed substantially vertically in the cutting lip 765, and positioned at the intersection of cutting edge segments 764. In this example, there is also provided an outboard cutting protrusion 780 formed at a location within the outboard cutting lip 765 of cutting edge segment 764. The outboard cutting protrusion may form a chip cutting edge that is substantially perpendicular to the outboard cutting edge segment 764. The use of a plurality of chip cutting edges 782 may facilitate formation of the desired size and configuration of chips for effective evacuation depending on the application, material or other factors. The plurality of substantially perpendicular chip cutting edges 782 may allow formation of chips which curl away from one another to minimize interaction between the chips as they are formed for example. Alternatively, for some applications, it may be desirable to cause interaction between the chips formed by each cutting edge segment 764 and cutting lips 765 in association with the chip cutting edges 782.

Figure 24:
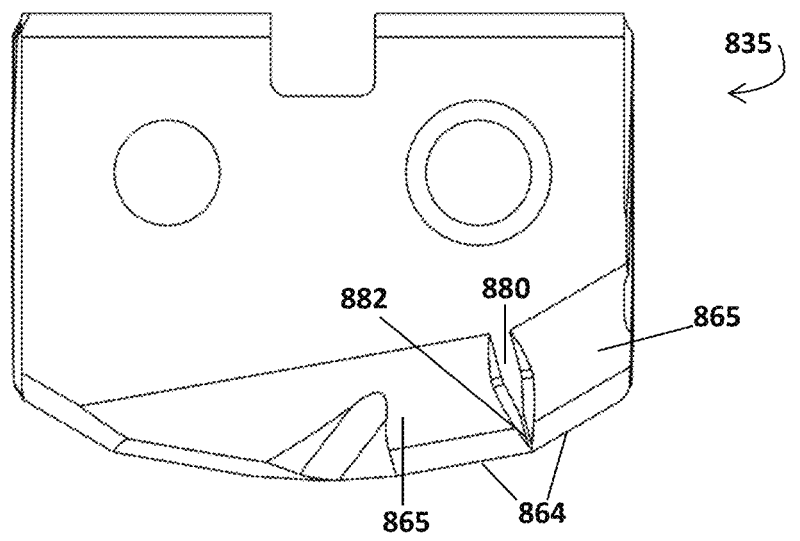
FIG. 24 shows a side view of another example of a cutting insert according to the invention.

With reference to FIG. 24, another example of the invention is shown. In this example, the machining insert 835 includes an inboard cutting edge segment 864 and an outboard cutting edge segment 864, with the outboard cutting edge segment 864 at an obtuse angle relative to the inboard cutting edge segment 864. The cutting lip configuration has at least one protrusion 880 and chip cutting edge 882 formed in the cutting lip 865. In this example, the chip cutting edge 882 is disposed relative to the cutting edges 864 and extending substantially perpendicularly from the intersection of the cutting edge segments 864. The secondary drill point angles of cutting edges 864 are again designed in this example to converge where the substantially perpendicular chip cutting edge 882 base is at the closest point to the main cutting edges 864. Again, the secondary angles of cutting edges 864 can vary in degree and may be selected for suitability in any particular material-cutting application.

Figure 25:
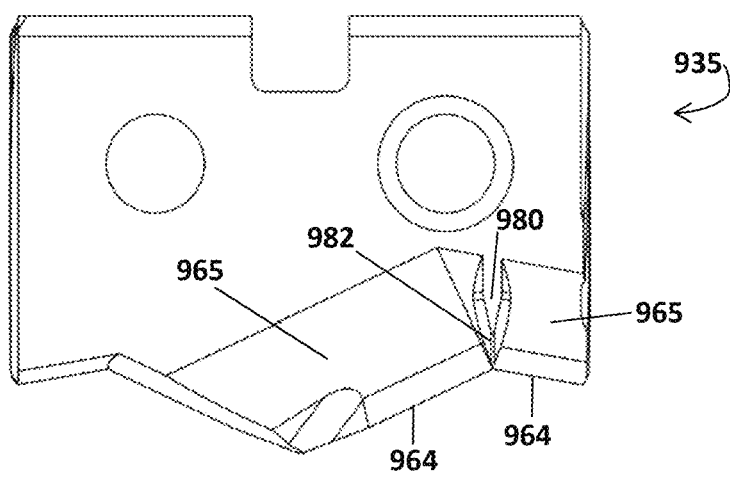
FIG. 25 shows a side view of another example of a cutting insert according to the invention.

With reference to FIG. 25, another example of the invention is shown. In this example, the machining insert 935 includes an inboard cutting edge segment 964 and an outboard cutting edge segment 964, with the outboard cutting edge segment 964 at a negative angle with respect to the inboard cutting edge segment 964. The cutting lip configuration has at least one protrusion 980 and chip cutting edge 982 formed in the cutting lip 965. In this example, the chip cutting edge 982 is disposed substantially vertically or axially relative to the cutting edges 964 and extending from adjacent the intersection of the cutting edge segments 964. The secondary drill point angles of cutting edges 964 are again designed in this example to converge where the substantially perpendicular chip cutting edge 982 base is at the closest point to the main cutting edges 964. Again, the secondary angles of cutting edges 964 can vary in degree and may be selected for suitability in any particular material-cutting application.

Figure 26:
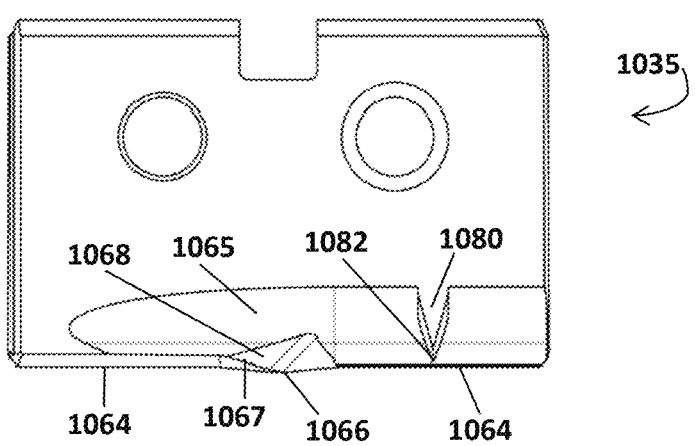
FIG. 26 shows a side view of another example of a cutting insert according to the invention.

With reference to FIG. 26, another example of the invention is shown. In this example, the machining insert 1035 is designed to cut a flat bottomed hole in a workpiece. In this example, the cutting edges 1064 extending from the rotational axis 1066 are of a height that remains consistent all the way to the center axis 1066. In this example, there is thus formed a slight upwardly inclined surface in each of the clearance surfaces 1067 at a location immediately adjacent the rotational axis 1066. The upwardly inclined surface associated with each of the cutting edges 1064 extends in a plane aligned with the longitudinal axis of insert 1035. Because clearance surface 1067 is angled downwardly from cutting edge 1064 via the back clearance angle, the upward inclination angle of surface 1067 is designed to work in conjunction with the back clearance angle such that these angles and the corresponding surfaces meet at approximately the rotational axis 1066 of insert 1035. Also in association with each of the upwardly inclined surfaces 1067 is a cutout portion 1068 which works in combination with the back clearance angle and angle of inclination or clearance transition angle to form the desired flat bottom cutting geometry. The cutout portions 1068 remove the sharp corner of the cutting edge 1064 at a point adjacent the rotational axis 1066 without destroying continuity of the cutting edges to facilitate obtaining the desired flat bottomed hole geometry. The cutting edges 1064 remain at a consistent height along the entire profile of the cutting edge. The cutting lip configuration has at least one protrusion 1080 and chip cutting edge 1082 formed in the cutting lip 1065. In this example, the chip cutting edge 1082 is disposed substantially vertically or axially relative to the cutting edges 1064.

Figures 27, 28, 29, 30:
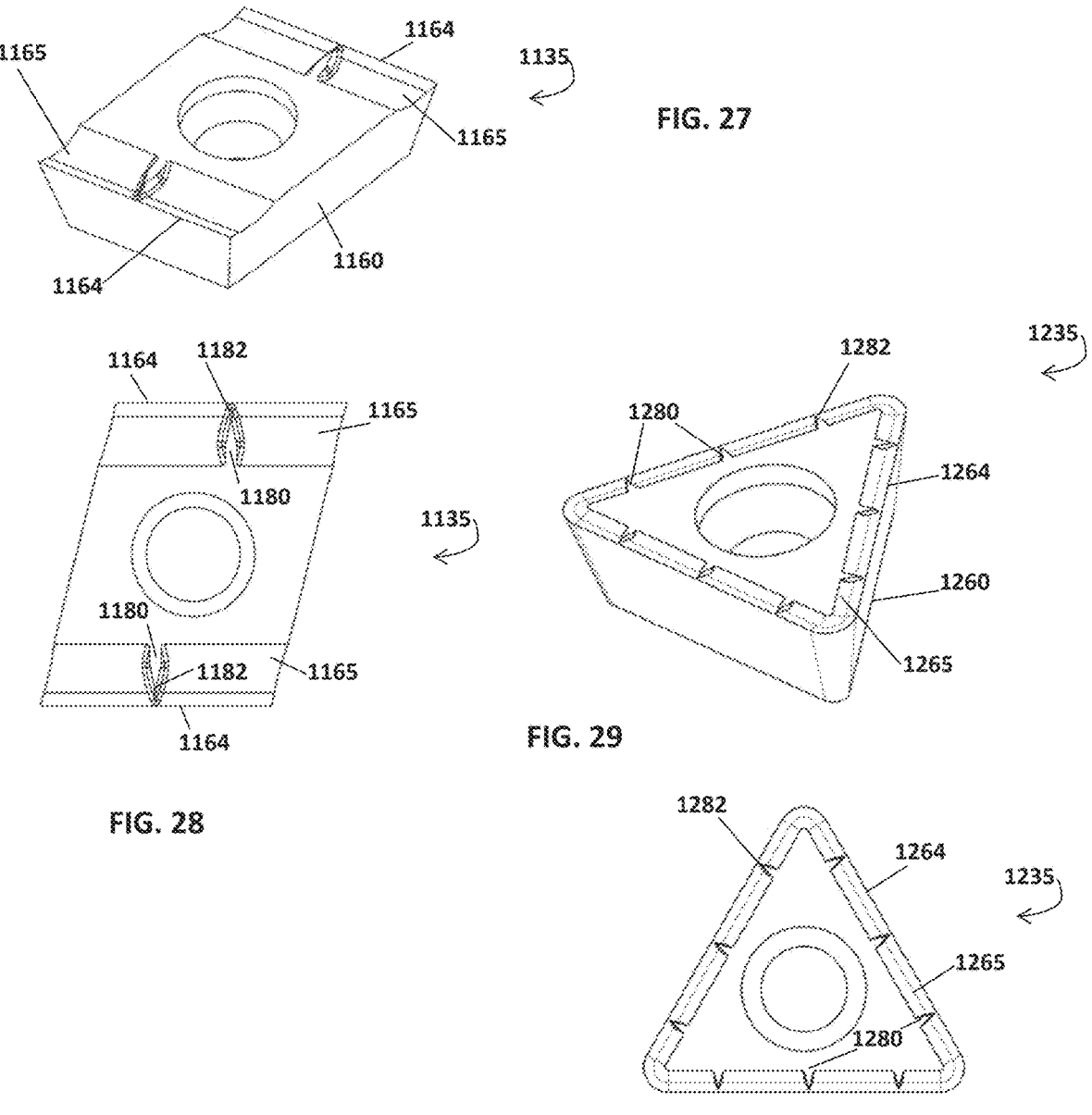
FIG. 27 shows a perspective view of another example of a cutting insert according to the invention.
FIG. 28 shows side view of the cutting insert in the example of FIG. 27.
FIG. 29 shows a perspective view of another example of a cutting insert according to the invention.
FIG. 30 shows a side view of the example of FIG. 29.

With reference to FIGS. 27-28, another example of the invention is shown. In this example, the machining insert 1135 is directed to an IC insert that may be useful in machining operations such as drilling, turning or milling for example. In this example, an indexable IC insert 1135 is formed in a diamond shape, and has first and second cutting edges 1164 on opposing sides of body 1160. Each cutting edge 1164 has a cutting lip 1165. In the cutting lips 1165, there is formed at least one cutting protrusion 1180 with chip cutting edge 1182. In this example, the cutting protrusions 1180 are disposed substantially vertically and perpendicular to the cutting edge 1164, at a predetermined position. The position of cutting protrusion may be varied depending on the application, material or other factors. In operation, the insert 1135 is indexable such that when a cutting edge 1164 becomes worn, the insert can be rotated to expose the other cutting edge 1164 for use. Such an insert 1135 may be used in turning, boring, planing, shaping, machining, and reaming processes for example.

With reference to FIGS. 29-30, another example of the invention is shown. In this example, the machining insert 1235 is directed to an IC insert that may be useful in machining operations such as drilling, turning or milling for example. In this example, an indexable IC insert 1235 is formed in a trigon shape, and has first, second and third cutting edges 1264 on the sides of body 1260. Each cutting edge 1264 has a cutting lip 1265. In the cutting lips 1265, there is formed at least one cutting protrusion 1280 with chip cutting edge 1282. In this example, there are a plurality of cutting protrusions 1280 which are disposed substantially vertically and perpendicular to the cutting edge 1264, at a predetermined positions along its length. The position of cutting protrusions 1280 may be varied depending on the application, material or other factors. In the example shown, the cutting protrusions 1280 are spaced symmetrically along the length of the cutting edges 1264. In operation, the insert 1235 is indexable such that when a cutting edge 1164 becomes worn, the insert can be rotated to expose another of the cutting edges 1264 for use. Such an insert 1235 may be used in turning, boring, planing, shaping, machining, and reaming processes for example.

Figures 31, 32:
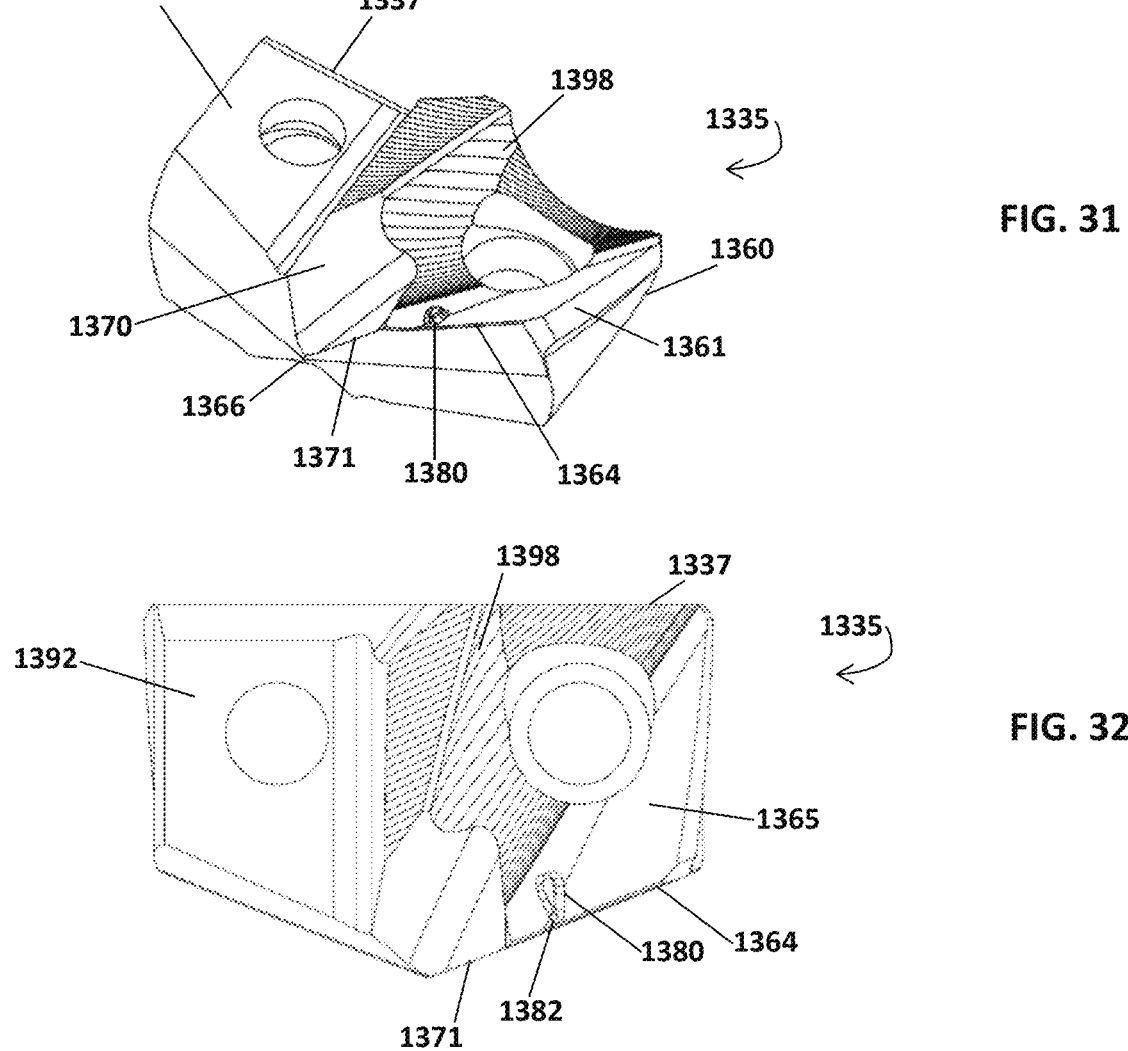
FIG. 31 shows a perspective view of another example of a cutting insert according to the invention.
FIG. 32 shows a side view of the example of FIG. 31.

With reference to FIGS. 31-32, another example of the invention is shown. In this example, the machining insert 1335 comprises a modified spade drill blade, with peripheral cylindrical side surfaces 1360 of the blade being generally arcuate and having a center at the rotational axis of the holder to which the insert 1335 is attached. When secured with the holder, insert 1335 will also have a rotational axis which desirably is coaxial with the rotational axis of the holder. Insert 1335 comprises an insert body 1337 having a first end, or cutting end with at least two curved cutting edges 1364, and associated cutting lips 1365. Each face side of insert 1335 comprises an attachment surface 1392 and a helical flute 1398. The attachment surfaces 1392 are generally planar and parallel to each other, although not limited as such. The peripheral cylindrical side surfaces 1360 may also include a helical margin 1361 adjacent the helical flute 1398. The drill insert body 1337 includes at least two apertures, each aperture positioned through each helical flute 1398 and extending through the drill insert body 1337 to the attachment surface 1392 of the opposite face side. The helical flutes 1398 may be formed at the same helix angle as that of flutes of the holder and positioned to form a continuous flute when the drill insert 1335 is assembled on the holder. The position of flute 1398 adjacent the cutting edge 1364 results in efficient and quick formation and removal of chips in conjunction with at least one cutting protrusion 1380 having at least one chip cutting edge disposed in the cutting lip 1365. The cutting protrusion 1380 may also be positioned so that the base of its substantially perpendicular cutting edge 1382 is adjacent or nearly adjacent to the insert's main cutting edge 1364 in order to split the forming chip before it curls naturally away from the cutting lip and thus away from the cutting protrusion 1380 and chip cutting edge 1382. After splitting chips into smaller segments, the helical flutes 1398 enable the removal of chips efficiently and quickly, even at high operating speeds. The cutting edges 1364 are formed by the interface of the cutting end and the helical flutes 1398 of the insert 1335 resulting in a curved cutting edge 1364 which generally can provide additional strength to the cutting edge to improve performance.

As previously mentioned, the drill insert 1335 includes curved cutting edges 1364 on its upper surface on each side of the axial center 1366, also known as the dead center. The cutting edges 1364 may include a plurality of cutting components, which cooperate together to provide the desired cutting surface 1364 for the material and/or application. Insert 1335 may also include a notch feature 1370 located on either side of the chisel 1366, which is formed across the insert web and extends through the axial center. The notch 1370 forms a type of flute on either side of insert 1335, which reduces the web and length of chisel 1366. In this example, the notch 1370 is shaped like a "V" having a radiused trough at the bottom of the notch 1370 and generally planar or curved leading and trailing sides. The notch 1170 is formed such that the trough is at a skewed angle with respect to the rotational axis of insert 1335, such that the leading edge of the notch 1370 forms a positive rake angle notch cutting edge 1371. Therefore, the notch 1370 actually extends the effective positive rake angle cutting edge length. The multiple cutting edges 1364, 1371, aggressively bite into the material to be machined and results in enhanced self-centering of the tool.

The at least one cutting protrusion 1380 is positioned in spaced relation to the notch cutting edge 1371, and extends a predetermined dimension from the position of its base adjacent the cutting edge 1364, which may vary depending on application, material or other factors. The chip cutting edge 1382 is disposed to be substantially perpendicular to the cutting edge 1364 to engage and cut chips formed by the cutting edge 1364 and notch cutting edge 1371.

The arrangement according to the examples of the present invention provides various advantages and overcomes problems associated with prior systems by effectively cutting formed chips into a smaller desired configuration for removal. The arrangements may be used in drilling processes and does not result in work hardening of the material adjacent the hole, as no significant forces are imposed on the sides of the formed hole. The cutting geometry provided by the machining insert according to the examples may comprise an included angle such that radial loads imposed by the system are minimized, and heat generation is also minimized, such that no embrittlement of the machined material occurs.

The configuration described herein and the particulars thereof can be readily applied to a variety of systems and applications. It is therefore understood that the above-described embodiments are illustrative of specific embodiments which can represent applications of the invention. Numerous and varied other arrangements can be made by those skilled in the art without departing from the spirit and scope of the invention.

What is claimed is:

1. A machining tool comprising a body having at least one main cutting edge, with at least one cutting lip forming a rake face adjacent the at least one main cutting edge, and at least one cutting protrusion provided in the at least one cutting lip, the at least one cutting protrusion having a body with a top surface and a chip cutting edge positioned at the forward end of the cutting protrusion body which extends away from the top surface of the body toward the rake face from a position spaced in close proximity to the at least one main cutting edge such that the chip of material formed by the at least one main cutting edge is engaged by the chip cutting edge of the at least one cutting protrusion and cut into separate chip sections that flow onto the at least one cutting lip and not over the top surface of the body of the at least one cutting protrusion body.

2. The machining tool of claim 1, wherein the at least one cutting protrusion has flank surfaces extending from the chip cutting edge away from the at least one main cutting edge such that at least one of the two separate chip sections formed by the chip cutting edge flow against at least one of the flank surfaces of the at least one cutting protrusion to impart strain to the chip section as the chip section moves away from the at least one main cutting edge.

3. The machining tool of claim 1, wherein the body has a rotational axis and at least two different main cutting edge segments and associated cutting lip segments are provided adjacent to one another on each side of the rotational axis, and the chip cutting edge of the at least one cutting protrusion is positioned adjacent the intersection of the at least two main cutting edge segments.

4. The machining tool of claim 1, wherein the body has a rotational axis and at least two different main cutting edge segments and associated cutting lip segments are provided adjacent to one another on each side from the rotational axis, and the cutting lip segments of the at least two different main cutting edge segments are each configured to have different structures from one another selected from the group consisting of different axial rake angles, different curvatures, different shapes designed to predispose the direction that chips formed by the adjacent main cutting edge segment flow or combinations thereof.

5. The machining tool of claim 1, wherein the chip cutting edge extends from the at least one cutting lip and has a height from the cutting lip to a top surface at least at the height of the side of the insert body.

6. The machining tool of claim 1, wherein the at least one cutting protrusion has a body with flank surfaces extending at an acute angle from the chip cutting edge a distance and a top surface has edges that extend at an acute angle a distance from the chip cutting edge and transition to being substantially parallel to one another.

7. The machining tool of claim 1, wherein the body of the at least one cutting protrusion extends over only a portion of the cutting lip.

8. The machining tool of claim 1, wherein the chip cutting edge is a sharp edge that extends substantially perpendicularly to a main cutting edge and vertically partitions the rake face of the cutting lip.

9. The machining tool of claim 1, wherein the body of the at least one cutting protrusion has flank surfaces extending from the chip cutting edge and at least one of the flank surfaces is configured to engage and impart strain to a chip section after it is formed.

10. The machining tool of claim 9, wherein at least one of the flank surfaces is configured to control the flow of a chip section away from the at least one main cutting edge.

11. The machining tool of claim 1, wherein the body of the at least one cutting protrusion is configured to control the flow of at least one of the formed chip sections during a machining operation.

12. The machining tool of claim 1, wherein there are at least two different main cutting edge segments and associated cutting lip segments with at least one secondary drill point angle converging where the base of a chip cutting edge is at the closest point to the main cutting edge segments.

13. The machining tool of claim 12, wherein the at least one secondary drill point angle orients the main cutting edge segments and associated cutting lips in a manner that at least one main cutting edge and associated cutting lip directs the flow of cut material in an oblique direction with respect to the chip cutting edge.

14. The machining tool of claim 1, wherein the geometry of the at least one cutting lip predisposes the chip sections to flow in a predetermined direction after being formed by the chip cutting edge of the at least one cutting protrusion.

15. The machining tool of claim 1, wherein the chip cutting edge is positioned to cut the chip formed at the at least one main cutting edge before it curls naturally away from the cutting lip.

16. The machining tool of claim 1, wherein the width, height, and/or wedge angle of the flank surfaces are varied based on characteristics of the material being machined.

17. The machining tool of claim 1, wherein the flank surfaces define a wedge angle from the chip cutting edge, and the wedge angle may be varied to make the chip cutting edge more or less pronounced based on characteristics of the material being machined.

18. The machining tool of claim 1, wherein the at least one cutting protrusion has a body and flanks extending from the chip cutting edge and wherein the body is angled relative to the at least one main cutting edge such that a split chip section does not flow against a flank wall of the at least one cutting protrusion.

19. A machining tool assembly comprising: a holder having first and second ends and a rotational axis, wherein the second end is adapted to be fixedly attached in a machining machine, and the first end having at least one cutting insert mounted thereon, the cutting insert having a body with a cutting end with at least one main cutting edge and associated rake surface, with at least one cutting protrusion including a chip cutting edge extending upwardly away from the rake surface from a spaced position adjacent the at least one main cutting edge at an angle to engage and cut the chip formed by the at least one main cutting edge during machining to immediately form chip sections that flow around the at least one cutting protrusion in the rake surface.

20. A machining insert for machining workpieces comprising: a body having a cutting end with at least one main cutting edge and associated rake surface, with at least one cutting protrusion adjacent the at least one main cutting edge having a body with a length and an axis extending transverse to the at least one main cutting edge, the body of the at least one cutting protrusion having a chip cutting edge positioned at the forward edge adjacent the at least one main cutting edge, wherein the chip cutting edge is configured to cut the chip formed by the at least one main cutting edge immediately after formation of the chip that causes flow of the split chip sections around the body of the at least one protrusion and the body of the at least one cutting protrusion separates the cut chip sections as they move away from the at least one main cutting edge.

* * * * *